US009352739B2

(12) United States Patent
Gibbs et al.

(10) Patent No.: US 9,352,739 B2
(45) Date of Patent: May 31, 2016

(54) METHOD FOR OPERATING A HYBRID VEHICLE

(75) Inventors: James C. Gibbs, Brighton, MI (US); Kevin A. Dietrich, Linden, MI (US); Larry D. Laws, Macomb, MI (US); Keith W. Weishuhn, Waterford, MI (US); John P. Blanchard, Holly, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 496 days.

(21) Appl. No.: 13/027,605

(22) Filed: Feb. 15, 2011

(65) Prior Publication Data

US 2012/0209463 A1  Aug. 16, 2012

(51) Int. Cl.
| | |
|---|---|
| *B60W 10/06* | (2006.01) |
| *B60K 6/46* | (2007.10) |
| *B60W 10/08* | (2006.01) |
| *B60W 20/00* | (2016.01) |
| *B60W 50/08* | (2012.01) |

(52) U.S. Cl.
CPC .............. *B60W 10/06* (2013.01); *B60K 6/46* (2013.01); *B60W 10/08* (2013.01); *B60W 20/00* (2013.01); *B60W 20/40* (2013.01); *B60W 50/087* (2013.01); *B60W 2540/10* (2013.01); *Y02T 10/48* (2013.01); *Y02T 10/6217* (2013.01); *Y02T 10/6286* (2013.01)

(58) Field of Classification Search
CPC ... B60W 20/00–20/102; B60W 20/106–20/20; B60W 20/40
See application file for complete search history.

(56) References Cited

U.S. PATENT DOCUMENTS

| | | | | |
|---|---|---|---|---|
| 5,806,617 | A * | 9/1998 | Yamaguchi ............ | B60K 6/365 180/65.235 |
| 6,504,259 | B1 * | 1/2003 | Kuroda ..................... | B60K 6/46 180/65.25 |
| 6,755,266 | B2 * | 6/2004 | Lasson ..................... | 180/65.235 |
| 7,281,509 | B2 * | 10/2007 | Fukui .................... | F02D 41/062 123/179.16 |
| 7,503,413 | B2 * | 3/2009 | Jiang ........................ | B60K 6/48 180/65.28 |
| 7,520,352 | B2 * | 4/2009 | Hoshiba ............. | B60H 1/00428 180/65.285 |
| 7,578,364 | B2 * | 8/2009 | Ohno ........................ | 180/65.28 |
| 7,708,095 | B2 * | 5/2010 | Hirata .................... | B60K 6/365 180/65.21 |
| 7,826,941 | B2 * | 11/2010 | Hayashi .................. | B60K 6/48 180/65.23 |
| 8,204,659 | B2 * | 6/2012 | Kouno et al. .................... | 701/55 |
| 8,370,014 | B2 * | 2/2013 | Ueno ..................... | B60K 6/365 180/65.265 |
| 8,417,406 | B2 * | 4/2013 | Bichler ................. | B60W 10/06 180/65.21 |
| 2001/0018903 | A1 * | 9/2001 | Hirose ..................... | B60K 6/48 123/179.4 |

(Continued)

*Primary Examiner* — Jonathan M Dager
(74) *Attorney, Agent, or Firm* — Reising Ethington, P.C.; Lionel D. Anderson

(57) ABSTRACT

A method for operating a hybrid vehicle, particularly one that includes both a primary and an auxiliary power source. According to one exemplary embodiment, the method seeks to decouple or disassociate a driver's engagement of an accelerator pedal with activation of an auxiliary power source, such as an internal combustion engine. This way, if the driver aggressively engages the accelerator pedal while the hybrid vehicle is being propelled by a battery and an electrical motor, the method will delay activation of the internal combustion engine so that the two events do not appear to be linked or connected to one another. Delaying activation of the internal combustion engine while the electric motor is under a heavy stress load may also improve the drive quality of the hybrid vehicle.

11 Claims, 2 Drawing Sheets

(56) References Cited

U.S. PATENT DOCUMENTS

| | | | |
|---|---|---|---|
| 2002/0063002 A1* | 5/2002 | Lasson | B60K 6/28 180/65.235 |
| 2002/0108794 A1* | 8/2002 | Wakashiro | B60K 6/48 180/65.25 |
| 2002/0157883 A1* | 10/2002 | Ogata | B60K 6/46 180/65.245 |
| 2002/0171383 A1* | 11/2002 | Hisada | B60K 6/445 318/432 |
| 2003/0172643 A1* | 9/2003 | Suzuki | B60K 6/48 60/284 |
| 2004/0043863 A1* | 3/2004 | Kondo | F16H 61/143 477/38 |
| 2004/0102288 A1* | 5/2004 | Ayabe | B60W 10/06 477/117 |
| 2004/0230376 A1* | 11/2004 | Ichikawa | G01C 21/26 702/2 |
| 2004/0255904 A1* | 12/2004 | Izawa | B60K 6/445 123/352 |
| 2005/0055140 A1* | 3/2005 | Brigham | B60K 6/48 701/22 |
| 2005/0273225 A1* | 12/2005 | Brigham et al. | 701/22 |
| 2005/0284679 A1* | 12/2005 | Hommi | B60K 6/445 180/197 |
| 2006/0180363 A1* | 8/2006 | Uchisasai | B60K 6/48 180/65.275 |
| 2007/0056784 A1* | 3/2007 | Joe | B60K 6/48 180/65.245 |
| 2007/0080005 A1* | 4/2007 | Joe | B60K 6/48 180/65.245 |
| 2007/0205031 A1* | 9/2007 | Ogata | B60K 6/48 180/65.29 |
| 2007/0227791 A1* | 10/2007 | Ueno | B60K 6/387 180/65.245 |
| 2007/0235006 A1* | 10/2007 | Nishigaki | F02D 31/003 123/339.1 |
| 2007/0284161 A1* | 12/2007 | Ohno | B60K 6/365 180/65.28 |
| 2008/0009388 A1* | 1/2008 | Tabata | B60K 6/445 477/2 |
| 2008/0015760 A1* | 1/2008 | Yamauchi | B60K 5/08 701/67 |
| 2008/0097677 A1* | 4/2008 | Kawakami | F02D 11/105 701/99 |
| 2008/0114525 A1* | 5/2008 | Sugimoto | F02P 5/1521 701/103 |
| 2008/0120006 A1* | 5/2008 | Hommi et al. | 701/84 |
| 2008/0154472 A1* | 6/2008 | Okuda | B60K 6/44 701/93 |
| 2008/0228363 A1* | 9/2008 | Kouno | B60K 6/48 701/54 |
| 2008/0306643 A1* | 12/2008 | Hanyu | B60K 6/48 701/22 |
| 2009/0240387 A1* | 9/2009 | Kawai | B60K 6/445 701/22 |
| 2009/0277702 A1* | 11/2009 | Kanada | B60K 6/445 180/65.29 |
| 2009/0322503 A1* | 12/2009 | Suzuki | B60K 6/445 340/438 |
| 2010/0006358 A1* | 1/2010 | Ishikawa | B60K 6/445 180/65.265 |
| 2010/0038159 A1* | 2/2010 | Jinno | B60K 6/40 180/65.265 |
| 2010/0116235 A1* | 5/2010 | Imamura | B60W 10/30 123/179.3 |
| 2010/0152938 A1* | 6/2010 | Aoki | B60W 20/16 701/22 |
| 2010/0204864 A1* | 8/2010 | Ando | B60K 6/445 701/22 |
| 2010/0292047 A1* | 11/2010 | Saito | B60K 6/365 477/5 |
| 2010/0312422 A1* | 12/2010 | Imaseki | B60K 6/365 701/22 |
| 2010/0324762 A1* | 12/2010 | Imaseki | B60K 6/36 701/22 |
| 2011/0004364 A1* | 1/2011 | Sawada | B60K 6/445 701/22 |
| 2012/0041621 A1* | 2/2012 | Marus | B60L 1/003 701/22 |
| 2014/0288743 A1* | 9/2014 | Hokoi | B60W 20/40 701/22 |

* cited by examiner

METHOD FOR OPERATING A HYBRID VEHICLE

TECHNICAL FIELD

The present invention generally relates to a hybrid vehicle and, more particularly, to a method for operating a hybrid vehicle that includes both a primary and an auxiliary power source.

BACKGROUND

Some hybrid vehicles use a primary power source for the majority of the vehicle's propulsion needs and supplement that with an auxiliary power source, as needed. For instance, a high-voltage battery and one or more electric motors may act as the primary power source for the hybrid vehicle, while an internal combustion engine may act as the auxiliary power source. Certain driving conditions, such as when the driver requests a significant amount of torque or acceleration, can present unique challenges for hybrid vehicles.

For example, when a driver aggressively engages the accelerator pedal of a hybrid vehicle, an electric motor (primary power source) may exhaust or at least diminish much of the stored charge on the battery. If the state-of-charge (SOC) of the battery falls beneath a certain threshold, the hybrid vehicle may have to rely on an internal combustion engine (auxiliary power source) to provide supplemental power for propulsion. However, starting the internal combustion engine immediately following engagement of the accelerator pedal may give the driver the false impression that the hybrid vehicle is primarily relying upon engine-based propulsion, as opposed to battery-based propulsion that is merely supplemented by the engine. Some drivers may find this undesirable. In addition, starting the internal combustion engine immediately following engagement of the accelerator pedal (i.e., when the hybrid vehicle is already under a heavy load or demand) can be rather noticeable to the driver and can negatively impact the drive quality of the vehicle, as will be explained in more detail.

SUMMARY

According to one embodiment, there is provided a method for operating a hybrid vehicle having a primary power source and an auxiliary power source. The method may comprise the steps of: (a) receiving a propulsion request while the primary power source is activated and the auxiliary power source is not activated; (b) predicting if the auxiliary power source will be activated in response to the propulsion request; and (c) if step (b) predicts that the auxiliary power source will be activated in response to the propulsion request, then delaying activation of the auxiliary power source so that there is a decoupling between the propulsion request and activation of the auxiliary power source.

According to another embodiment, there is provided a method for operating a hybrid vehicle having a primary power source that includes an electric motor and an auxiliary power source that includes an internal combustion engine. The method may comprise the steps of: (a) receiving a propulsion request from an accelerator pedal sensor; (b) using the propulsion request to determine if the internal combustion engine will be turned 'on'; and (c) if step (b) determines that the internal combustion engine is to be turned 'on', then lowering a desired state-of-charge (SOC) range for a battery instead of immediately turning 'on' the internal combustion engine.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

The method described herein may be used to operate a hybrid vehicle and, in particular, to operate a primary and an auxiliary power source during periods of significant driver demand. According to one embodiment, the method seeks to decouple or disassociate engagement of an accelerator pedal with activation of an auxiliary power source, like an internal combustion engine. If the driver aggressively engages the accelerator pedal while the hybrid vehicle is being propelled by an electrical motor, for example, the method will delay activation of the internal combustion engine so that the two events do not appear to be linked or connected to one another. Delaying activation of the internal combustion engine while the electric motor is under a heavy stress load may also improve the drive quality of the hybrid vehicle, as will be explained. The method described below uses a power management scheme that is specifically adapted to address this kind of situation.

A "hybrid vehicle," as used herein, broadly includes any vehicle that has two or more sources of power that can be used for purposes of vehicle propulsion. Some examples of suitable hybrid vehicles include, but are certainly not limited to, hybrid electric vehicles (HEVs), plug-in hybrid electric vehicles (PHEVs), extended-range electric vehicles (EREVs), two-mode hybrids, full hybrids, power-assist hybrids, mild hybrids, series hybrids, parallel hybrids, series-parallel hybrids, power-split hybrids, BAS or BAS-plus hybrids, hydraulic hybrids, pneumatic hybrids, or any other type of hybrid vehicle. This includes passenger cars, cross-over vehicles, sports-utility vehicles, recreational vehicles, trucks, buses, commercial vehicles, etc. Although the following description is provided in the context of an exemplary plug-in hybrid electric vehicle (PHEV) with a range-extending series hybrid configuration, it should be appreciated that the present method may be used with any hybrid vehicle and is not limited to any one particular type.

Figure 1:
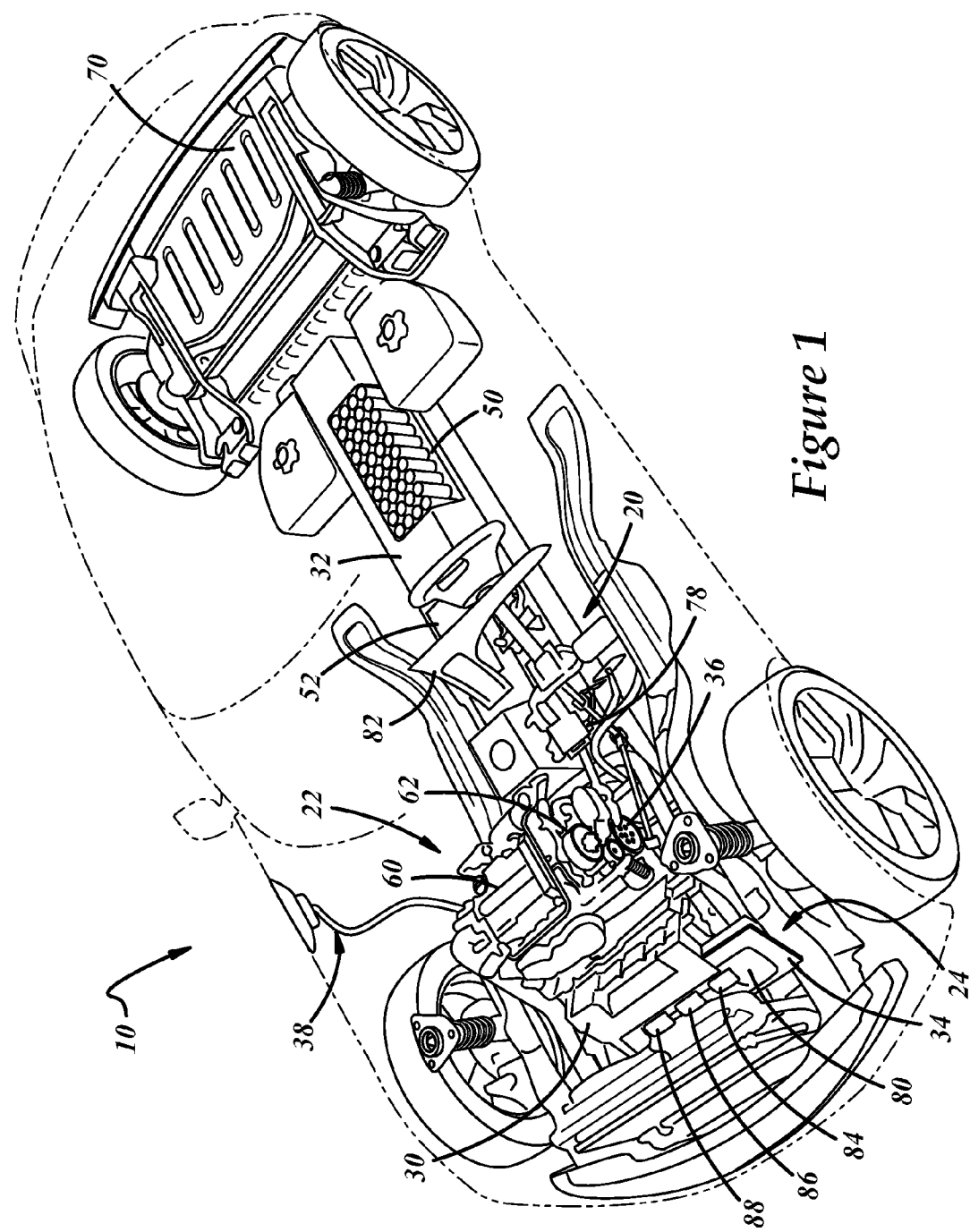
FIG. 1 is a perspective view depicting portions of an exemplary hybrid vehicle.

With reference to FIG. 1, there is shown a schematic view of an exemplary plug-in hybrid electric vehicle (PHEV) 10 having a range-extending series hybrid configuration where a high-voltage battery drives an electric motor for vehicle propulsion, and an internal combustion engine drives a generator for producing electrical energy. It is also possible, however, for hybrid vehicle 10 to have a parallel hybrid configuration, where both an electric motor and an internal combustion engine are mechanically coupled to the power train and take turns propelling the vehicle, as opposed to the engine only driving a generator. According to this exemplary embodiment, hybrid vehicle 10 includes a primary power source 20, an auxiliary power source 22, and a control system 24. Because many of the components of hybrid vehicle 10 are generally known in the art and because many different components and arrangements may be used with the present method, a brief explanation is provided here in lieu of a detailed recitation of their individual structure and functionality.

Primary power source 20 is largely responsible for vehicle propulsion and, according to this particular embodiment, may include any combination of a charger 30, a battery 32, an inverter/converter 34, and/or one or more electric motor(s) 36. In general, battery charger 30 receives electrical energy from one or more sources, converts and/or conditions the electrical energy so that it is in a suitable form for battery 32, and provides the converted electrical energy to the battery where it is stored. During vehicle propulsion, battery 32 provides electrical energy to inverter/converter 34 where it is again converted, this time into a form suitable for electric motor 36, and is provided to the electric motor for driving the wheels of the vehicle. During regenerative braking, electric motor 36 may act as a generator and provide electrical energy to battery 32 via inverter/converter 34. As mentioned above, this is only one potential configuration, as it is not necessary for hybrid vehicle 10 to be arranged in this particular way.

Charger 30 may receive electrical energy from a variety of sources, including external power sources (e.g., a standard AC electrical outlet, a remote charging station, an external generator, etc.) and/or internal power sources (e.g., an onboard generator). In the case of an external power source, charger 30 receives electrical energy through a suitable power coupling or charging cord 38 that connects the external power source to the charger. Skilled artisans will appreciate that charger 30 may be provided according to any number of different embodiments, may be connected in any number of different configurations, and may include any number of different components, such as transformers, rectifiers, switching power supplies, filtering means, cooling means, sensors, control units and/or any other suitable components known in the art.

Battery 32 may store electrical energy that is used to drive electric motor(s) 36, as well as to meet other electrical needs of the hybrid vehicle. According to an exemplary embodiment, battery 32 includes a high-voltage battery pack 50 (e.g., 40V-600V) and a sensor unit 52. Battery pack 50 includes a number of individual battery cells and may utilize any suitable battery chemistry, including those that are based on the following technologies: lithium ion, nickel metal hydride (NiMH), nickel cadmium (NiCd), sodium nickel chloride (NaNiCl), or some other battery technology. Battery 32 should be designed to withstand repeated charge and discharge cycles and may be used in conjunction with other energy storage devices, such as capacitors, super capacitors, inductors, etc. Those skilled in the art will appreciate that battery 32 may be provided according to any number of different embodiments, may be connected in any number of different configurations, and may include any number of different components, like sensors, control units and/or any other suitable components known in the art.

Inverter/converter 34 may act as an intermediary between battery 32 and electric motor(s) 36, as these devices are often times designed to function according to different operational parameters. For example, during vehicle propulsion inverter/converter 34 can step-up the voltage from battery 32 and convert the current from DC to AC in order to drive electric motor(s) 36, while during regenerative braking the inverter/converter may step-down the voltage generated by a braking event and convert the current from AC to DC so that it can be properly stored by the battery. In a sense, inverter/converter 34 manages how these different operational parameters (i.e., AC versus DC, various voltage levels, etc.) work together. Inverter/converter 34 may include an inverter for DC to AC conversion, a rectifier for AC to DC conversion, a step-up converter or transformer for increasing the voltage, a step-down converter or transformer for decreasing the voltage, other suitable energy management components, or some combination thereof. In the exemplary embodiment shown, inverter and converter units are integrated into a single bi-directional device, however, other embodiments are certainly possible. It should be realized that inverter/converter 34 may be provided according to any number of different embodiments (e.g., with separate inverter and converter units, bi-directional or uni-directional, etc.), may be connected in any number of different configurations, and may include any number of different components, like cooling systems, sensors, control units and/or any other suitable components known in the art.

Electric motor(s) 36 may use electrical energy stored in battery 32 and/or provided by auxiliary power source 22 to drive the vehicle wheels, which in turn propels the hybrid vehicle. While FIG. 1 schematically depicts electric motor 36 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. Thus, the following description only refers to a single electric motor 36 even though more than one electric motor may be used by the hybrid vehicle. Primary power source 20 is not limited to any one particular type of electric motor, as many different motor types, sizes, technologies, etc. may be used. In one example, electric motor 36 includes an AC motor (e.g., a three-phase AC induction motor, etc.) as well as a generator that can be used during regenerative braking. Electric motor 36 may be provided according to any number of different embodiments (e.g., AC or DC motors, brushed or brushless motors, permanent magnet motors, etc.), may be connected in any number of different configurations, and may include any number of different components, like cooling features, sensors, control units and/or any other suitable components known in the art. Electric motor 36, as well as some other components of the vehicle power train, may be securely attached or mounted to the vehicle chassis through motor mounts having rubber bushings or the like.

The "primary power source," as used herein, generally refers to the device or combination of devices that is usually responsible for vehicle propulsion. In the exemplary embodiment described above, this includes battery 32, electric motor 36 and the other devices that operate in conjunction therewith. During normal operating conditions, electric motor 36 provides the mechanical output that rotates the wheels and propels hybrid vehicle 10, however, the primary power source is not limited to these specific devices. In other hybrid vehicle embodiments, the "primary power source" may include a device or combination of devices that differs from that described here.

Auxiliary power source 22 may provide power in the event that battery 32 is depleted and, according to this particular embodiment, includes an internal combustion engine 60 and a generator 62. In general, engine 60 turns generator 62, which in turn creates electrical energy that may be used to recharge battery 32, to drive electric motor 36 or other electrical devices in the hybrid vehicle, or to do both. The specific allocation of electrical energy from generator 62 may be influenced by the state of the battery (e.g., does the battery have a low state-of-charge (SOC), etc.), by performance demands on the motor (e.g., is the driver trying to accelerate the vehicle), etc. In another embodiment, engine 60 is replaced with a fuel cell, a hydraulic or pneumatic system, or some other alternative energy supply that is capable of providing electrical energy to the hybrid vehicle.

Engine 60 may drive generator 62 using conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 60 is a small fuel-efficient engine (e.g., a small displacement, turbo-charged four-cylinder engine) that receives fuel from fuel tank 70 and uses the mechanical output of the engine to turn generator 62. Skilled artisans will appreciate that engine 60 may be provided according to any number of different embodiments, may be connected in any number of different configurations, and may include any number of different components, like sensors, control units and/or any other suitable components known in the art. In one potential embodiment, engine 60 is part of a parallel hybrid system where the engine is mechanically coupled to the vehicle wheels instead of exclusively being used to drive a generator.

Generator 62 is mechanically coupled to engine 60 so that the mechanical output of the engine causes the generator to create electrical energy that may be provided to battery 32, electric motor 36, or both. As with all of the exemplary components described herein, generator 62 may include one of any number of suitable generators known in the art and is certainly not limited to any particular type. It is worth noting that generator 62 may be provided according to any number of different embodiments (e.g., the generator of motor 36 and generator 62 may be combined into a single unit), may be connected in any number of different configurations, and may include any number of different components, like cooling units, sensors, control units and/or any other suitable components known in the art. Again, the preceding description of exemplary hybrid vehicle 10 and the illustration in FIG. 1 are only intended to illustrate one potential hybrid arrangement and to do so in a general way. Any number of other hybrid arrangements and architectures, including those that differ significantly from the one shown in FIG. 1, may be used instead.

The "auxiliary power source," as used herein, generally refers to the device or combination of devices that provides the hybrid vehicle with supplemental or auxiliary power for vehicle propulsion when the primary power source is not doing so. In the exemplary embodiment described above, this includes engine 60, generator 62, and any other devices that operate in conjunction therewith. When battery 32 and electric motor 36 cannot fulfill the propulsion needs of hybrid vehicle 10 by themselves, engine 60 drives generator 62 and causes it to provide supplement power to the vehicle. It should be appreciated, however, that the auxiliary power source is not limited to these specific devices. In other hybrid vehicle embodiments, the "auxiliary power source" may include a device or combination of devices that differs from that described here.

Control system 24 may be used to control, govern or otherwise manage certain operations or functions of hybrid vehicle 10 and, according to one exemplary embodiment, includes an accelerator pedal sensor 78, a hybrid control unit 80, and a user interface 82. Accelerator pedal sensor 78 may provide control system 24 with signals that are representative of the torque or acceleration being manually requested by the driver. For example, accelerator pedal sensor 78 may include any type of suitable sensor component and may be coupled to the accelerator pedal so that when the driver engages the accelerator pedal for vehicle propulsion, the accelerator pedal sensor can interpret the driver's input and send a propulsion request signal that is representative thereof. Skilled artisans will appreciate that various types of accelerator pedal sensors may be used and that various types of propulsion requests may be generated and sent. The present method is not limited to any particular type.

Hybrid control unit 80 may use stored algorithms or other electronic instructions to manage the activities of the various components and devices of both the primary power source 20 and the auxiliary power source 22 so that these two systems can seamlessly interact with one another and can react to a variety of changing conditions. Depending on the particular embodiment, hybrid control unit 80 may be a stand-alone electronic module (e.g., a vehicle integrated control module (VICM), a traction power inverter module (TPIM), a battery power inverter module (BPIM), etc.), it may be incorporated or included within another electronic module in the vehicle (e.g., a powertrain control module, an engine control module, etc.), or it may be part of a larger network or system (e.g., a battery management system (BMS), a vehicle energy management system, etc.), to name a few possibilities. According to this particular embodiment, hybrid control unit 80 is at least partially responsible for performing certain aspects of the power management scheme described below in conjunction with the present method.

Hybrid control unit 80 may include any combination of electronic processing devices 84, memory devices 86, input/output (I/O) devices 88, and/or other known components, and may perform various control and/or communication related functions. Processing device 84 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 86 may include any type of suitable electronic memory means and may store a variety of data and information. This includes, for example: sensed vehicle conditions; look-up tables and other data structures; software, firmware, programs, algorithms, scripts, and other electronic instructions; component characteristics and background information, etc. The present method including certain aspects of the power management scheme—as well as any other electronic instructions and/or information needed for such tasks—may also be stored or otherwise maintained in memory device 86. Hybrid control unit 80 may be electronically connected to other vehicle devices and modules via I/O device 88 and suitable connections, like a communications bus, so that they can interact as required. These are, of course, only some of the possible arrangements, functions and capabilities of hybrid control unit 80, as others are certainly possible.

User interface 82 may be used to exchange information between a vehicle user and the vehicle, and may do so in a variety of ways. For instance, user interface 82 may receive user requests, instructions and/or other input from a vehicle user via: a touch-screen display, a pushbutton or other vehicle control, a keyboard, a microphone (e.g., cases where input is verbally provided and interpreted by a human-machine interface (HMI)), or a wireless communication module (e.g., cases where input is wirelessly provided from a mobile communications device, laptop, desktop, website, backend facility, etc.), to cite a few examples. In addition, user interface 82 may be used to provide vehicle status, reports and/or other output to the vehicle user. The same devices and techniques for providing input, as well as others like a vehicle audio system and instrument panel, may also be used to provide output. Other user interfaces may be provided instead, as the exemplary ones shown and described herein represent only some of the possibilities. The present method may utilize any user interface to exchange information with the vehicle and is not limited to any particular type.

Hybrid vehicle 10 may include more, less or a different combination of elements, components, devices and/or modules than those illustrated and described here, as the present method is not limited to this particular embodiment. For example, hybrid vehicle 10 may include parts such as: a hybrid transmission, a power-split device, a gear box, one or more clutches, a flywheel and/or other hybrid power train components; a low-voltage electrical circuit or bus (e.g., standard 12V, 18V or 42V circuits), an accessory power module (APM), electronic accessories, different electronic modules, a telematics unit, additional electric motors and/or other electronic devices; as well as any other devices that may be found on hybrid vehicles. The components, devices and/or modules shown in FIG. 1 may be integrated or otherwise combined with other parts of the hybrid vehicle, as the illustration in that figure is only meant to generally and schematically illustrate one potential hybrid system arrangement.

Figure 2:
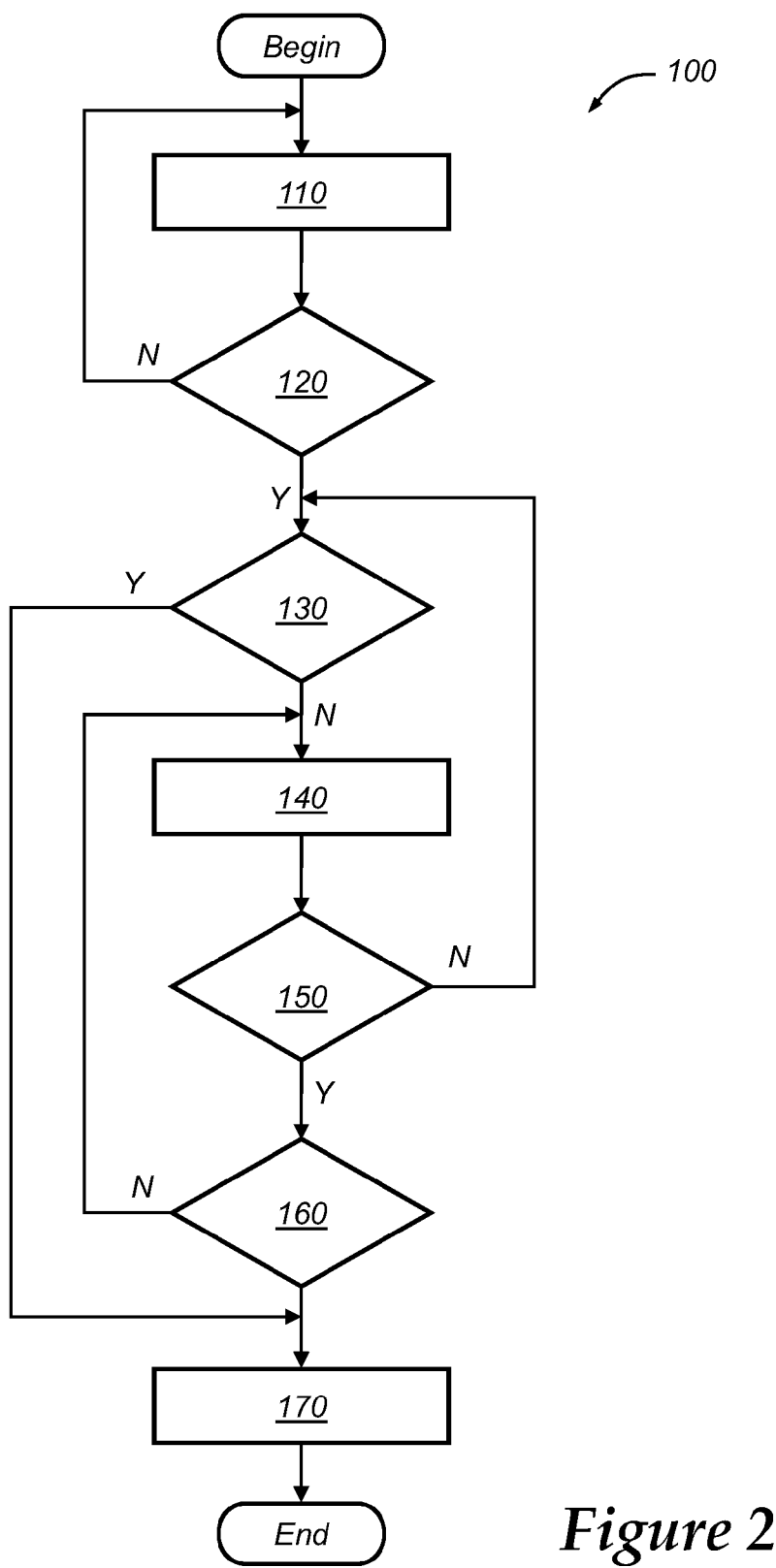
FIG. 2 is a flowchart illustrating certain steps of an exemplary method that may be used to operate a hybrid vehicle, such as the exemplary one shown in FIG. 1.

Turning now to FIG. 2, there is shown an exemplary embodiment of a method 100 for operating a hybrid vehicle, like the one shown in FIG. 1. According to one aspect, method 100 seeks to decouple or disassociate engagement of an accelerator pedal with activation of an auxiliary power source, such as an internal combustion engine 60. This way, for example, if the driver aggressively engages the accelerator pedal while the hybrid vehicle is being propelled by a battery and an electrical motor, method 100 will delay activation of the internal combustion engine so that the two events do not appear to be linked or connected to one another. Delaying activation of the internal combustion engine while the electric motor is under a heavy stress load may also improve the drive quality of the hybrid vehicle, as will be explained. According to an exemplary embodiment, method 100 delays activation of the auxiliary power source by allowing the state-of-charge (SOC) on the battery to temporarily dip below its normal SOC range, but does so in a manner that still protects the battery. Other aspects and features of this power management scheme will become apparent from the description below.

In step 110, the method receives a propulsion request from the driver, such as when the driver engages the accelerator pedal. In this particular case, the propulsion request is received while primary power source 20 is activated (e.g., the electric motor) and auxiliary power source 22 is not activated (e.g., the internal combustion engine). As will become clearer from the following description, the exemplary method is generally not applicable in situations where the auxiliary power source has already been turned 'on' and is activated. According to an exemplary embodiment, step 110 receives a propulsion request from accelerator pedal sensor 78 that is representative of the torque being manually requested by the driver. When the driver engages an accelerator pedal, an electronic propulsion request or command is sent from accelerator pedal sensor 78 to hybrid control unit 80 or the like. However, this is not the only way for step 110 to receive a propulsion request. In another embodiment, step 110 may receive a propulsion request from one or more electronic modules in the vehicle, where the propulsion request is representative of the torque being automatically requested by that module. For instance, if the driver has engaged a cruise control feature, then a propulsion request may be sent by a cruise control module or the like, instead of accelerator pedal sensor 78, so that the driver's predetermined vehicle speed can be maintained. It should be appreciated that the term 'propulsion request' broadly includes all requests, commands and/or other signals that relate to a requested torque for propelling the vehicle.

Next, step 120 predicts if the auxiliary power source will be activated in response to the propulsion request, and may do so in one of a variety of ways. The auxiliary power source 22 is typically activated (e.g., an engine start event) when the state-of-charge (SOC) of battery 32 becomes too low due to the electrical demands on the vehicle. In one potential embodiment, step 120 extracts a requested torque from the propulsion request and compares the requested torque to some torque threshold. If the requested torque exceeds the torque threshold, then step 120 may conclude that auxiliary power source 22 will be turned 'on'; if the requested torque does not exceed the torque threshold, then step 120 may determine that auxiliary power source 22 will remain 'off'. The preceding torque threshold may be an absolute value (e.g., compare the requested torque to 200 N·m), it may use a torque threshold that involves a rate of change (e.g., determine if the requested torque has changed by more than 100 N·m within 1 second), it may use different torque thresholds for different operating conditions (e.g., a first torque threshold for normal driving, a second torque threshold for hauling, etc.), or it may assume some other form. Skilled artisans will appreciate that more factors than just requested torque may go into the prediction in step 120. For example, the current vehicle speed, the current overall electrical load in the vehicle, the current state-of-charge (SOC) of battery 32, etc. could all play a role in this prediction. If the hybrid vehicle is at a standstill when the driver aggressively engages the accelerator pedal, then step 120 may determine that there is a higher likelihood that auxiliary power source 22 will need to be activated than if the vehicle was already traveling at a high vehicle speed. Similarly, if the battery state-of-charge (SOC) is already at a low level when the driver engages the accelerator pedal, then there may be a higher likelihood that auxiliary power source 22 will need to be activated than if the battery was fully charged. The preceding examples are only some of the factors and techniques that may be employed by step 120 in order to predict or determine if the auxiliary power source will be activated. Others may be used as well.

If step 120 predicts that the auxiliary power source will not be activated in response to the propulsion request, then the method may simply loop back to step 110 for continued monitoring. If, however, step 120 predicts that auxiliary power source activation is likely (i.e., the vehicle is under a heavy load and will likely need to turn 'on' the auxiliary power source), then the method may proceed to step 130 which checks to see if a delay timer has expired. At this point, under normal circumstances and without exemplary method 100, the hybrid vehicle would simply process the propulsion request and if it became necessary to turn on auxiliary power source 22, then it would do so. But, as mentioned above, method 100 may want to delay starting auxiliary power source 22 during heavy loading or stress scenarios. Step 130 can use a delay timer (e.g., 2, 5, 10 seconds, etc.) to hold off or delay activation of auxiliary power source 22, which includes internal combustion engine 60 in the exemplary embodiment above. If step 130 determines that the delay timer has expired and that a sufficient amount of time has passed since the driver engaged the accelerator pedal, then the method may proceed to step 170 and activate or turn 'on' auxiliary power source 22. In the example above, this involves starting up internal combustion engine 60. By waiting for the delay timer to expire, the method seeks to decouple or disassociate the engagement of the accelerator pedal with the starting of the internal combustion engine. If step 130 determines that the delay timer has not expired, then the method may proceed to step 140. Although FIG. 2 shows steps 140-160, it should be appreciated that these steps are optional and that it is possible for these steps to be omitted so that the method simply waits for the delay timer in step 130 to expire without inquiring about other parameters.

Step 140 determines a power train load. The power train load is representative of one or more mechanical stresses that are in the power train of the hybrid vehicle and are associated with the operation of the primary power source. To illustrate, consider the example where the driver aggressively engages the accelerator pedal so that electric motor 36 outputs a significant amount of torque to the vehicle power train. In this situation, there is a significant amount of mechanical stress and strain throughout the power train, including at the motor and engine mounts which physically connect or secure motor 36 and engine 60, respectively, to the vehicle chassis. If internal combustion engine 60 (i.e., the auxiliary power source) was started during this already-stress period, the resulting vibrations could be transmitted through the motor and/or engine mounts and could shock the system in a way that is noticeable to the driver. This, in turn, can negatively impact the overall drive quality and feel of the hybrid vehicle. The mechanical stress and strain just described is an example of a power train load, and may be determined in a number of different ways. For instance, it is possible for step 140 to actually measure a power train load with some type of strain gauge or other sensor located at or near the power train. It is also possible for step 140 to calculate or deduce a power train load based on certain operating conditions, like the amount of electrical voltage and/or current being sent to electric motor 36. In an exemplary embodiment, step 140 calculates a power train load and compares it to a load threshold (e.g., 200 N·m) in an effort to gauge the relative stress or load that is currently on the vehicle's power train. If the power train load does not exceed the load threshold, then the method assumes that is acceptable to continue waiting for the delay timer to expire; thus, the method loops back to step 130. If, on the other hand, the power train load exceeds the load threshold, then the method proceeds to step 160.

In step 160, the method compares one or more battery conditions to a battery threshold. For example, some types of high-voltage batteries, like those based on different kinds of lithium-ion chemistries, have a preferred state-of-charge (SOC) range (e.g., 25%-75%). When the battery SOC reaches 75%, the hybrid vehicle may prevent continued charging of battery 32 (i.e., prevent a further increase in battery SOC); similarly, when the battery SOC falls below 25%, the hybrid vehicle may turn 'on' internal combustion engine 60 so that additional electrical charge can be generated and used to charge battery 32. By maintaining battery 32 within this desired SOC range, the overall life of the battery can be extended. According to an exemplary embodiment, step 160 modifies or adjusts the lower limit of the desired SOC range to account for the particular circumstances at hand. For instance, if step 150 determines that the power train of the hybrid vehicle is currently experiencing a high stress scenario, then step 160 may adjust the desired SOC range by slightly and temporarily lowering its lower limit so that the hybrid vehicle can avoid any engine start ups that are not absolutely necessary. The amount with which the desired SOC range is lowered is preferably selected so that it does not cause any permanent damage to battery 32.

To illustrate, consider the example where the current SOC is 23% and the desired SOC range is 25%-75%. Under normal circumstances, an SOC of 23% would cause the hybrid vehicle to activate or otherwise start up internal combustion engine 60 so that it can charge battery 32 and bring it back within the desired SOC range. However, step 160 recognizes that the vehicle is currently experiencing somewhat unique conditions (e.g., the heavy stress conditions in the vehicle power train) and, therefore, temporarily lowers the lower limit of the desired SOC range to 20%. Since the current SOC of 23% is above the newly lowered or modified limit of 20%, the method is able to avoid an engine start up event. Moreover, by temporarily altering or adjusting the desired SOC range, the method does not cause any long term damage to battery 32. Skilled artisans will appreciate that the desired SOC range may be adjusted or modified in any number of different ways. It is possible, for example, for the method to store a modified SOC range in memory device 86 or elsewhere, or for the method to simply compare the current SOC value to the un-modified SOC range minus some predetermined amount (e.g., the normal desired SOC range minus 5%). By making a small, temporary adjustment or modification to the desired SOC range, the method may be able to avoid starting auxiliary power source 22 and thus avoid the inaccurate perception that the hybrid vehicle is not sufficiently powered to handle the driver's propulsion request. If step 160 determines that the current battery SOC is within the modified SOC range, then the method loops back to step 130 to see if the delay timer has expired yet. If the current battery SOC is not within the modified SOC range, then the method concludes that the charge level is too low and that auxiliary power source 22 should be turned on. In which case, the method continues to step 170, which activates auxiliary power source 22 (e.g., turns 'on' or starts the internal combustion engine).

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for operating a hybrid vehicle having a primary power source and an auxiliary power source, comprising the steps of:
   (a) receiving a propulsion request while the primary power source is activated and the auxiliary power source is not activated, the propulsion request is in response to an aggressive engagement of an accelerator pedal by the driver;

(b) predicting if the auxiliary power source will be activated in response to the propulsion request; and (c) if step (b) predicts that the auxiliary power source will be activated in response to the propulsion request, then determining if a delay timer has expired and delaying activation of the auxiliary power source until the expiration of the delay timer so that there is a decoupling between the propulsion request that is in response to an aggressive engagement of the accelerator pedal by the driver and activation of the auxiliary power source, wherein delaying activation of the auxiliary power source includes waiting until the delay timer has expired and the driver is no longer aggressively engaging the accelerator pedal before cranking an internal combustion engine.

2. The method of claim 1, wherein step (a) further comprises receiving a propulsion request from an accelerator pedal sensor, and the propulsion request is representative of a torque being manually requested by the driver.

3. The method of claim 1, wherein step (a) further comprises receiving a propulsion request from an electronic module in the vehicle, and the propulsion request is representative of a torque being automatically requested by the electronic module.

4. The method of claim 1, wherein step (b) further comprises predicting if the auxiliary power source will be activated by extracting a requested torque from the propulsion request and comparing the requested torque to a torque threshold.

5. A method for operating a hybrid vehicle having a primary power source and an auxiliary power source, comprising the steps of:

(a) receiving a propulsion request while the primary power source is activated and the auxiliary power source is not activated, the propulsion request is in response to an aggressive engagement of an accelerator pedal by the driver;

(b) predicting if the auxiliary power source will be activated in response to the propulsion request; and (c) if step (b) predicts that the auxiliary power source will be activated in response to the propulsion request, then determining if a delay timer has expired and delaying activation of the auxiliary power source until the expiration of the delay timer so that there is a decoupling between the propulsion request that is in response to an aggressive engagement of the accelerator pedal by the driver and activation of the auxiliary power source, wherein step (c) further comprises determining a power train load that is representative of a mechanical stress that is in the power train of the hybrid vehicle and is associated with operation of the primary power source.

6. The method of claim 5, wherein the primary power source is an electric motor used for vehicle propulsion and the power train load is calculated using at least one of the voltage or the current that is provided to the electric motor.

7. The method of claim 5, wherein step (c) further comprises comparing the power train load to a load threshold, and if the power train load does not exceed the load threshold then continuing to delay activation of the auxiliary power source, and if the power train load does exceed the load threshold then determining at least one battery condition.

8. The method of claim 7, wherein step (c) further comprises comparing the at least one battery condition to a battery threshold, and if the battery condition exceeds the threshold then continuing to delay activation of the auxiliary power source, and if the battery condition does not exceed the battery threshold then activating the auxiliary power source.

9. The method of claim 8, wherein the at least one battery condition is a state-of-charge (SOC) and the battery threshold is a lower SOC limit minus a predetermined percentage.

10. The method of claim 1, wherein the primary power source is an electric motor that is driven by a high-voltage battery and the auxiliary power source is an internal combustion engine that drives an electric generator.

11. A method for operating a hybrid vehicle having a primary power source that includes an electric motor and an auxiliary power source that includes an internal combustion engine, comprising the steps of:

(a) receiving a propulsion request from an accelerator pedal sensor;

(b) using the propulsion request to determine if the internal combustion engine will be turned on; and (c) if step (b) determines that the internal combustion engine is to be turned on, then lowering a desired state-of-charge (SOC) range for a battery instead of immediately turning on the internal combustion engine so that there is a disconnection between the propulsion request and turning the internal combustion engine on.

* * * * *